US012640482B2

(12) United States Patent
Dai

(10) Patent No.: US 12,640,482 B2

(45) Date of Patent: May 26, 2026

(54) SPOILER ANTENNA

(71) Applicant: Pittsburgh Glass Works LLC, Cheswick, PA (US)

(72) Inventor: David Dai, Novi, MI (US)

(73) Assignee: Pittsburgh Glass Works LLC, Cheswick, PA (US)

( * ) Notice: Subject to any disclaimer, the term of this patent is extended or adjusted under 35 U.S.C. 154(b) by 329 days.

(21) Appl. No.: 18/120,529

(22) Filed: Mar. 13, 2023

(65) Prior Publication Data

US 2023/0291109 A1 Sep. 14, 2023

Related U.S. Application Data

(60) Provisional application No. 63/319,626, filed on Mar. 14, 2022.

(51) Int. Cl.

*H01Q 9/04* (2006.01)
*H01Q 1/32* (2006.01)
*H01Q 5/371* (2015.01)

(52) U.S. Cl.

CPC ......... *H01Q 9/0421* (2013.01); *H01Q 1/3275* (2013.01); *H01Q 5/371* (2015.01)

(58) Field of Classification Search

CPC .... H01Q 9/0421; H01Q 1/3275; H01Q 5/371; H01Q 1/38; H01Q 5/321; H01Q 5/378;

(Continued)

(56) References Cited

U.S. PATENT DOCUMENTS 5,629,712 A 5/1997 Adrian et al.
6,980,164 B2 12/2005 Sampo et al.

(Continued)

FOREIGN PATENT DOCUMENTS

EP 3139440 A1 3/2017
JP 2017220915 A * 12/2017

OTHER PUBLICATIONS

S. B. Cohn, "Parallel-Coupled Transmission-Line-Resonator Filters," in IRE Transactions on Microwave Theory and Techniques, vol. 6, No. 2, pp. 223-231, Apr. 1958. (Year: 1958).*

(Continued)

*Primary Examiner* — Dimary S Lopez Cruz
*Assistant Examiner* — Anna N Hamadyk
(74) *Attorney, Agent, or Firm* — The Webb Law Firm

(57) ABSTRACT

A band-pass filter may include a first electrical conductor extending a first distance; a second electrical conductor extending from the first electrical conductor, the second electrical conductor may extend a second distance at least partially parallel to the first distance; and a third electrical conductor extending a third distance parallel to and between the first electrical conductor and the second electrical conductor. The first and third electrical conductors may at least partially overlap along a first length, and the first and third electrical conductors may be electromagnetically coupled at least along the first length. The second and third electrical conductors may at least partially overlap along a second length, and the second and third electrical conductors may be electromagnetically coupled at least along the second length. The first length may correspond to a first frequency. The second length may correspond to a second frequency.

20 Claims, 12 Drawing Sheets

(58) Field of Classification Search
CPC . H01Q 9/42; H01Q 21/30; H01Q 5/40; H01P 1/2135
See application file for complete search history.

(56) References Cited

U.S. PATENT DOCUMENTS

| | | | | |
|---|---|---|---|---|
| 2005/0017824 | A1 | 1/2005 | Hirabayashi | |
| 2015/0222010 | A1* | 8/2015 | Dai | H01Q 1/50 343/713 |
| 2017/0125877 | A1 | 5/2017 | Ochi et al. | |
| 2019/0319334 | A1 | 10/2019 | Dai | |
| 2020/0373654 | A1 | 11/2020 | Shukutani et al. | |
| 2022/0006179 | A1 | 1/2022 | Miller | |

OTHER PUBLICATIONS

Jen-Tsai Kuo, E. Shih and Wei-Cheng Lee, "Design of bandpass filters with parallel three-line coupled microstrips," APMC 2001. 2001 Asia-Pacific Microwave Conference (Cat. No. 01TH8577), Taipei, Taiwan, 2001, pp. 157-160 vol. 1. (Year: 2001).*
Hong et al., A 10-35-GHz Six-Channel Microstrip Multiplexer for Wide-Band Communication Systems, IEE Transactions on Microwave Theory and Techniques, Apr. 2006, pp. 1370-1378, vol. 54, No. 4.

* cited by examiner

SPOILER ANTENNA

CROSS-REFERENCE TO RELATED APPLICATION

This application claims priority to U.S. Provisional Patent Application No. 63/319,626 filed Mar. 14, 2022, the disclosure of which is hereby incorporated by reference in its entirety.

BACKGROUND OF THE INVENTION

Field of the Invention

The present disclosure relates to a vehicle antenna, in particular, an AM, FM, DAB, and TV antenna that can be concealed within a vehicle rear spoiler.

Description of Related Art

The most common types of antennas for radio reception is the standard fender mount or roof mount antenna. The mast type antenna has been used due to its good performance and lower cost. However, the automotive industry has sought to eliminate the mast type antenna due to the wind noise, high warranty cost, susceptibility to water leakage, susceptibility to vandalism and damage, as well as unpleasant body styling. Concealed on-glass antennas provide no additional aerodynamic drag and wind noise, which is a significant advantage over the mast type antenna. They also require no mounting holes on the vehicle body to mount the antenna. Antenna conductors are typically screen printed on a glass sheet surface in patterns that form the antenna. More recently, embedded wire antennas of quarter or half wavelengths have been used in laminated windshields and back windows. Traditionally, antenna windshields have included a wire that is embedded in an interlayer of polyvinyl butyral that is sandwiched between a pair of glass sheets. A galvanized, flat cable connector connected the wire antenna to the vehicle electronic module. Before lamination, one end of the connector was soldered to an end of the antenna wire on the interlayer. The other end of the connector extended from the edge of the laminated glazing to provide a connection in the antenna module.

A spoiler antenna is another type of conformal antenna that has been widely used as a vehicle mount antenna. The spoiler that attached to the body of a vehicle is made to decrease wind resistance and drag when on the road, so it provides a better airflow across the back of the vehicle. Having a spoiler also gives the vehicle a look that is sportier and sleeker than other vehicles. Typically, spoilers are molded from plastic resin and antenna elements may be attached or disposed to the inside of a spoiler.

Spoiler antenna designs in the prior art have been primarily for AM and FM radio reception. For example, U.S. Pat. No. 5,629,712 entitled "Vehicular Slot Antenna Concealed in Exterior Trim Accessory" from Ford Motor Company discloses a vehicular AM and FM radio antenna that concealed within a body trim piece such as a spoiler or a luggage rack. A supporting body panel is utilized as a ground plane, and a conductive loop is concealed within the trim piece. A transmission line connects two opposite sides of the resulting slot with capacitors connecting the conductive loop to the sheet metal ground plane in order to form a dual slot/monopole antenna for receiving both FM and AM signals. U.S. Pat. No. 6,980,164 B2 entitled "Automobile Antenna Apparatus" from Yokowo uses a T-type, F-type, or L-type monopole antenna disposed inside a spoiler for AM and FM radio reception. US Patent Publication No. 2022/0006179 A1 entitled "Vehicle Antenna Assembly" from TE Connectivity Services discloses an antenna assembly for installation on a spoiler of a vehicle that includes a U-shape substrate having antenna elements coupled to the substrate. The antenna element includes an upper antenna portion, a lower antenna portion, and a rear antenna portion between the upper antenna portion and the lower antenna portion. The primary antenna element operates as an AM/FM antenna element and a secondary antenna element operating as a digital audio broadcasting (DAB). European Patent No. 3139440 B1 entitled "Antenna" from Asahi Glass Company discloses a duel band FM/DAB spoiler antenna. The antenna elements include a first element resonating in a first frequency band and a second element, which is capacitively coupled to the first antenna element via a capacitive coupling portion, and the second element combined with the first element through the capacitive coupling generate a second frequency band which is different from the first frequency band.

With rapid growth in the need for vehicle electronics, more and more antennas have been integrated to the vehicle. At FM and TV frequencies in particular, the system requires a number of antennas for diversity operation to overcome multipath and fading effects. In most cases as of today, separate antennas and antenna feeds are utilized to meet the requirements of AM, FM, TV, Weather Band, Remote Keyless Entry, and DAB Band III. Multiple coaxial cables running from antenna to the receiver can be avoided by combining the separate antenna signals using an electrical network. Such a network, however, involves the added complexity and expense of a separate module. In order to limit complexity and expense of an antenna system, the number of antenna feeds needs to be kept to a minimum. Thus, there is a need to provide an antenna, particularly concealed spoiler antenna, with multiple frequency bands for different applications. Such an antenna may reduce the number of antennas on the vehicle in order to simplify the antenna and associated electronics design with advanced antenna matching and frequency tuning methods.

SUMMARY OF THE INVENTION

According to a first embodiment or aspect of the present disclosure, a band pass-filter may include a first electrical conductor extending a first distance; a second electrical conductor extending from the first electrical conductor, the second electrical conductor may extend a second distance at least partially parallel to the first distance; and a third electrical conductor extending a third distance parallel to and between the first electrical conductor and the second electrical conductor. The first electrical conductor and the third electrical conductor may at least partially overlap along a first length, and the first electrical conductor and the third electrical conductor may be electromagnetically coupled at least along the first length. The second electrical conductor and the third electrical conductor may at least partially overlap along a second length, and the second electrical conductor and the third electrical conductor may be electromagnetically coupled at least along the second length. The first length may correspond to a first frequency, and the second length may correspond to a second frequency.

The first length may be equal to an effective quarter wavelength corresponding to the first frequency. The first frequency may be a center frequency of an FM/DAB band. The second length may be equal to an effective quarter wavelength corresponding to the second frequency. The second frequency may be a center frequency of a TV band.

The band-pass filter may include a fourth electrical conductor extending from the third electrical conductor. The fourth electrical conductor may extend a fourth distance at least partially parallel to the first, second, and third distances. The fourth electrical conductor and the first electrical conductor may at least partially overlap along a third length, and the fourth electrical conductor and the first electrical conductor may be electromagnetically coupled at least along a third length. The third length may correspond to a third frequency. The third length may be equal to an effective quarter wavelength corresponding to the third frequency. The third frequency may be a center frequency of a broad band.

The first electrical conductor may be connected to a first pin of an antenna connector at an end opposing the first length. A second pin of the antenna connector may be connected to a fifth electrical connector, and the fifth electrical connector may be configured to receive AM broadcasting signals. The third electrical conductor may be separated from the first electrical conductor by a first width, and the third electrical conductor may be separated from the second electrical conductor by a second width.

According to another embodiment or aspect of the present disclosure, a band-pass filter may include a parasitic element extending a first distance, and a first electrical conductor. The first electrical conductor may include: a first branch extending a second distance where the second distance may be at least partially overlapping and extending parallel to the parasitic element; and a second branch extending a third distance where the third distance may be at least partially overlapping and extending parallel to the parasitic element. The first branch may overlap the parasitic element along a first length, and the first branch and the parasitic element may be electromagnetically coupled along the first length. The second branch may overlap the parasitic element along a second length, and the second branch and the parasitic element may be electromagnetically coupled along the second length. The first length may correspond to a first frequency, and the second length may correspond to a second frequency.

The second branch may be connected to the first branch proximate a first port at a first end of the band-pass filter. The first frequency may be a center frequency of an FM/DAB band, and the second frequency may be a center frequency of a TV band.

The band-pass filter may include a second electrical conductor which may include: a third branch extending a fourth distance where the fourth distance may be at least partially overlapping and extending parallel to the parasitic element; and a fourth branch extending a fifth distance where the fifth distance may be at least partially overlapping and extending parallel to the parasitic element. The third branch may overlap the parasitic element along a third length, and the third branch and the parasitic element may be electromagnetically coupled along the third length. The fourth branch may overlap the parasitic element along a fourth length, and the fourth branch and the parasitic element may be electromagnetically coupled along the fourth length. The third length may correspond to a third frequency, and the fourth length may correspond to a fourth frequency. The fourth branch may be connected to the third branch proximate a second port at a second end of the band-pass filter, and the second end may oppose the first end.

According to another embodiment or aspect of the present disclosure, a spoiler antenna assembly for an automobile may include: a spoiler mounted to the automobile where the spoiler antenna may include a spoiler substrate; and a spoiler antenna disposed on the spoiler substrate, where the spoiler antenna may include: a first electrical conductor extending a first distance; a second electrical conductor extending from the first electrical conductor where the second electrical conductor may extend a second distance at least partially parallel to the first distance; and a third electrical conductor extending a third distance parallel to and between the first electrical conductor and the second electrical conductor. The first electrical conductor and the third electrical conductor may at least partially overlap along a first length, and the first electrical conductor and the third electrical conductor may be electromagnetically coupled at least along the first length. The second electrical conductor and the third electrical conductor may at least partially overlap along a second length, and the second electrical conductor and the third electrical conductor may be electromagnetically coupled at least along the second length. The first length may correspond to a first frequency, and the second length may correspond to a second frequency.

The spoiler antenna may also include a fourth electrical conductor extending from the third electrical conductor where the fourth electrical conductor may extend a fourth distance at least partially parallel to the first, second, and third distances. The fourth electrical conductor and the first electrical conductor may at least partially overlap along a third length where the fourth electrical conductor and the first electrical conductor may be electromagnetically coupled at least along a third length. The third length may correspond to a third frequency. The first frequency may be a center frequency of an FM/DAB band, the second frequency may be a center frequency of a TV band, and the third frequency may be a center frequency for a broad band. The spoiler antenna may also include a cover mounted to the spoiler and configured to cover the spoiler antenna.

In some embodiments or aspects, the present disclosure may be characterized by one or more of the following numbered clauses:

Clause 1. A band-pass filter comprising: a first electrical conductor extending a first distance; a second electrical conductor extending from the first electrical conductor, the second electrical conductor extending a second distance at least partially parallel to the first distance; and a third electrical conductor extending a third distance parallel to and between the first electrical conductor and the second electrical conductor, wherein the first electrical conductor and the third electrical conductor at least partially overlap along a first length, the first electrical conductor and the third electrical conductor being electromagnetically coupled at least along the first length, wherein the second electrical conductor and the third electrical conductor at least partially overlap along a second length, the second electrical conductor and the third electrical conductor being electromagnetically coupled at least along the second length, wherein the first length corresponds to a first frequency, and wherein the second length corresponds to a second frequency.

Clause 2. The band-pass filter of clause 1, wherein the first length is equal to an effective quarter wavelength corresponding to the first frequency.

Clause 3. The band-pass filter of clause 1 or 2, wherein the first frequency is a center frequency of an FM/DAB band.

Clause 4. The band-pass filter of any of clauses 1-3, wherein the second length is equal to an effective quarter wavelength corresponding to the second frequency.

Clause 5. The band-pass filter of any of clauses 1-4, wherein the second frequency is a center frequency of a TV band.

Clause 6. The band-pass filter of any of clauses 1-5, further comprising a fourth electrical conductor extending from the third electrical conductor, the fourth electrical conductor extending a fourth distance at least partially parallel to the first, second, and third distances, wherein the fourth electrical conductor and the first electrical conductor at least partially overlap along a third length, the fourth electrical conductor and the first electrical conductor being electromagnetically coupled at least along a third length, wherein the third length corresponds to a third frequency.

Clause 7. The band-pass filter of any of clauses 1-6, wherein the third length is equal to an effective quarter wavelength corresponding to the third frequency.

Clause 8. The band-pass filter of any of clauses 1-7, wherein the third frequency is a center frequency of a broad band.

Clause 9. The band-pass filter of any of clauses 1-8, wherein the first electrical conductor is connected to a first pin of an antenna connector at an end opposing the first length.

Clause 10. The band-pass filter of any of clauses 1-9, wherein a second pin of the antenna connector is connected to a fifth electrical connector, the fifth electrical connector configured to receive AM broadcasting signals.

Clause 11. The band-pass filter of any of clauses 1-10, wherein the third electrical conductor is separated from the first electrical conductor by a first width, and the third electrical conductor is separated from the second electrical conductor by a second width.

Clause 12. A band-pass filter comprising: a parasitic element extending a first distance; and a first electrical conductor comprising: a first branch extending a second distance, the second distance at least partially overlapping and extending parallel to the parasitic element; and a second branch extending a third distance, the third distance at least partially overlapping and extending parallel to the parasitic element, wherein the first branch overlaps the parasitic element along a first length, the first branch and the parasitic element being electromagnetically coupled along the first length, wherein the second branch overlaps the parasitic element along a second length, the second branch and the parasitic element being electromagnetically coupled along the second length, wherein the first length corresponds to a first frequency, and wherein the second length corresponds to a second frequency.

Clause 13. The band-pass filter of clause 12, wherein the second branch is connected to the first branch proximate a first port at a first end of the band-pass filter.

Clause 14. The band-pass filter of clause 12 or 13, wherein the first frequency is a center frequency of an FM/DAB band, and wherein the second frequency is a center frequency of a TV band.

Clause 15. The band-pass filter of any of clauses 12-14, further comprising: a second electrical conductor comprising: a third branch extending a fourth distance, the fourth distance at least partially overlapping and extending parallel to the parasitic element; and a fourth branch extending a fifth distance, the fifth distance at least partially overlapping and extending parallel to the parasitic element, wherein the third branch overlaps the parasitic element along a third length, the third branch and the parasitic element being electromagnetically coupled along the third length, wherein the fourth branch overlaps the parasitic element along a fourth length, the fourth branch and the parasitic element being electromagnetically coupled along the fourth length, wherein the third length corresponds to a third frequency, and wherein the fourth length corresponds to a fourth frequency.

Clause 16. The band-pass filter of any of clauses 12-15, wherein the fourth branch is connected to the third branch proximate a second port at a second end of the band-pass filter, the second end opposing the first end.

Clause 17. A spoiler antenna assembly for an automobile, the assembly comprising: a spoiler mounted to the automobile, the spoiler comprising a spoiler substrate; and a spoiler antenna disposed on the spoiler substrate, the spoiler antenna comprising: a first electrical conductor extending a first distance; a second electrical conductor extending from the first electrical conductor, the second electrical conductor extending a second distance at least partially parallel to the first distance; and a third electrical conductor extending a third distance parallel to and between the first electrical conductor and the second electrical conductor, wherein the first electrical conductor and the third electrical conductor at least partially overlap along a first length, the first electrical conductor and the third electrical conductor being electromagnetically coupled at least along the first length, wherein the second electrical conductor and the third electrical conductor at least partially overlap along a second length, the second electrical conductor and the third electrical conductor being electromagnetically coupled at least along the second length, wherein the first length corresponds to a first frequency, and wherein the second length corresponds to a second frequency.

Clause 18. The spoiler antenna assembly of clause 17, wherein the spoiler antenna further comprises: a fourth electrical conductor extending from the third electrical conductor, the fourth electrical conductor extending a fourth distance at least partially parallel to the first, second, and third distances, wherein the fourth electrical conductor and the first electrical conductor at least partially overlap along a third length, the fourth electrical conductor and the first electrical conductor being electromagnetically coupled at least along a third length, wherein the third length corresponds to a third frequency.

Clause 19. The spoiler antenna assembly of clause 17 or 18, wherein the first frequency is a center frequency of an FM/DAB band, the second frequency is a center frequency of a TV band, and the third frequency is a center frequency for a broad band.

Clause 20. The spoiler antenna assembly of any of clauses 17-19, further comprising a cover mounted to the spoiler and configured to cover the spoiler antenna.

BRIEF DESCRIPTION OF THE DRAWING(S)

DESCRIPTION OF THE INVENTION

Figure 1:
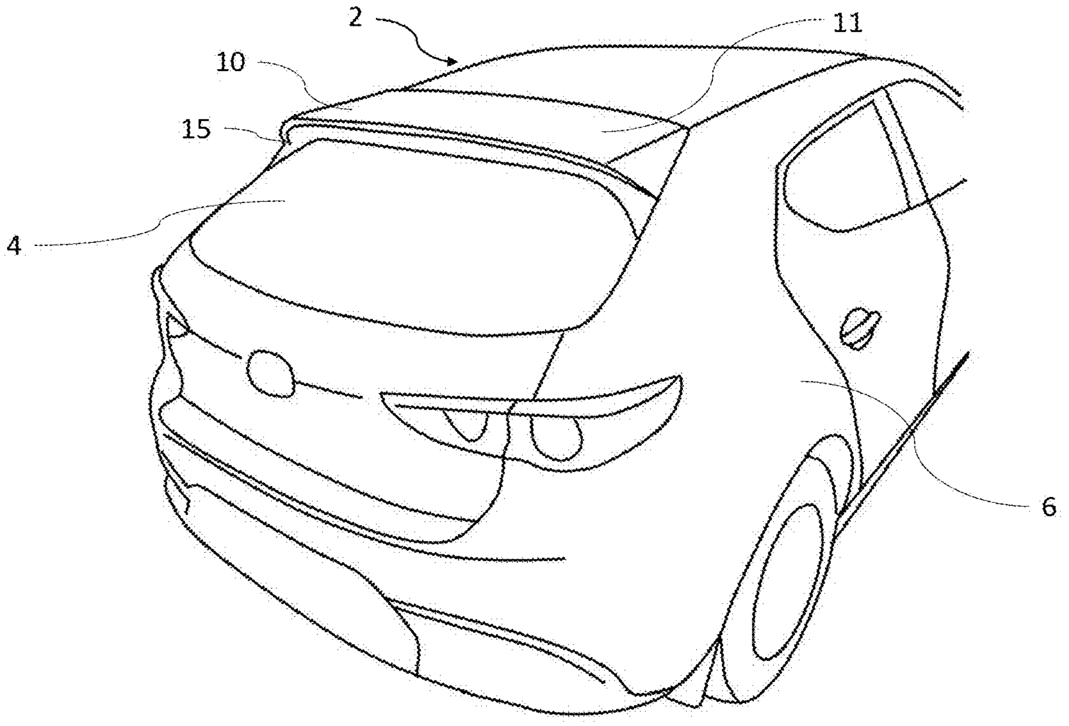
FIG. 1 is a rear perspective view of a vehicle having a spoiler with an antenna in accordance with one embodiment or aspect of the present disclosure.

FIG. 1 illustrates a vehicle 2 having a spoiler 10 mounted above a rear window 4. The spoiler 10 is made to decrease wind resistance and drag when on the road, thereby providing a better airflow across the back of the vehicle. The spoiler 10 also gives a desired aesthetic appearance to the vehicle 2. Typically, the spoiler 10 is molded from plastic resin and includes a spoiler cover 11 and a spoiler substrate 15. Antenna elements may be attached or disposed on the spoiler substrate 15, as will be discussed in greater detail below.

Figure 2:
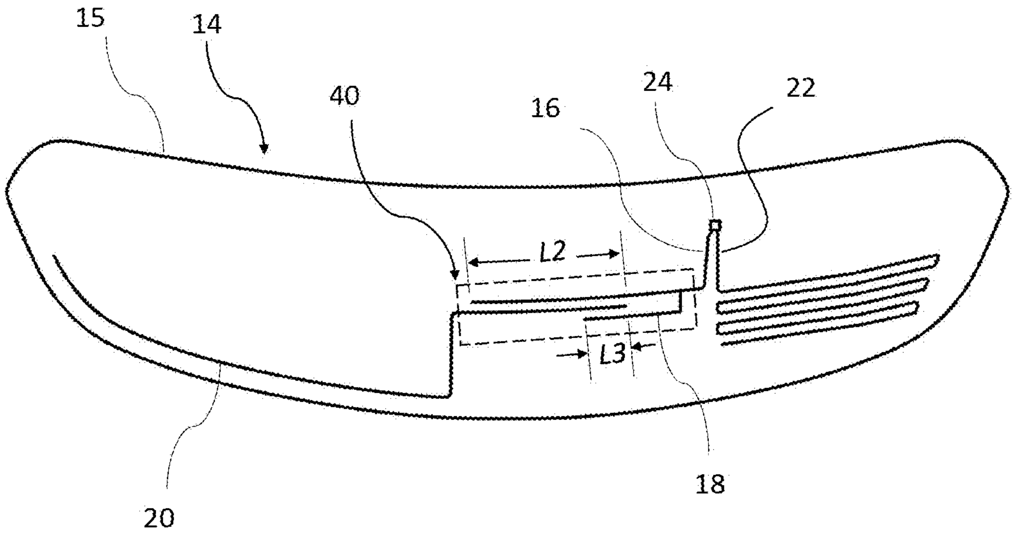
FIG. 2 shows a top view of a spoiler having an antenna according to one embodiment or aspect of the present disclosure.

With reference to FIG. 2, a spoiler antenna 14 according to a first embodiment of the present disclosure is shown. The spoiler antenna 14 is shown without the spoiler cover 11, so that antenna lines 16, 18, 20, 22 are visible. The antenna lines 16, 18, 20, 22 are attached to the spoiler substrate 15 and are made of conductive material, so that the antennas 16, 18, 20, 22 act as electrical conductors. Examples of the conductive material used to make the antennas 16, 18, 20, 22 are a metal wire covered with insulating dielectric cover and a conductive foil printed, glued or disposed on the surface of spoiler substrate 15. Other conductive materials known to those having skill in the art may also be used. Such a spoiler antenna 14 can be used, for example, for an AM radio, FM radio, a digital audio broadcast (DAB) receiver, digital television (TV) receiver, and broad band receiver. The antennas 16, 18, 20, 22 are typically monopole antennas disposed on the substrate 15. When spoiler 10 mounted on vehicle 10, the antennas 16, 18, 20, 22 use the conductive vehicle body 6 as a ground plane.

The antennas 16, 18, 20, 22 can be arranged so that the resonance length(s) that match an input electromagnetic wave are integer multiples of quarter-wavelengths. For monopoles, this is represented by the equation L=n (λ/4). Even multiples of λ/4 monopole antennas have a very high input impedance and need a transformer to feed the antenna. Therefore, only odd multiples of λ/4 monopole antennas can be matched to a 50Ω antenna feed, such as for the antennas 16, 18, 20, 22 that are used herein, due to their lower impedance. For example, a λ/4 monopole antenna resonated at FM 100 MHz (λ/4) can also be used at 300 MHz (3λ/4), 500 MHz (5λ/4) and so on.

As shown in FIG. 2, the spoiler antenna 14 includes four antennas 16, 18, 20, 22, also known as antenna lines. Antenna line 22 is a single wire type antenna used for receiving AM broadcasting signal. Antenna line 16, in combination with antenna line 18 and antenna line 20, form a broadband antenna used for single wire type antenna used for receiving FM, DAB, and TV broadcasting signals. Antenna line 16 and antenna line 22 are both connected to a duel pin antenna connector 24 that can be connected to a coaxial cable, amplifier, or another piece of equipment (not shown) to transmit the signals received by the spoiler antenna 14 into the vehicle 2.

Antenna line 16 and antenna line 18 are connected. Antenna line 18 extends from antenna line 16 in a direction perpendicular to antenna line 16 before continuing to extend in a direction parallel to antenna line 16, as shown in FIG. 2. Both of these antenna lines 16, 18 are electromagnetically coupled to antenna line 20. Antenna line 20 extends between both antenna lines 16, 18 to create the electromagnetic coupling. Antenna line 20 extends parallel to antenna lines 16, 18 when it is located between those lines. The coupling between antenna line 16 and antenna line 20 occurs along coupling length L2. The coupling length L2 is the length shared between both of these antenna lines 16, 20. In other words, coupling length L2 is the length that antenna line 16 overlaps antenna line 20 on the spoiler substrate 15. The coupling between antenna line 18 and antenna line 20 occurs along coupling length L3 Like coupling length L2, coupling length L3 is the length along which antenna line 18 overlaps antenna line 20 on the spoiler substrate 15.

Coupling length L2 has a length equal to an effective quarter wavelength $\lambda_{eff}/4$ corresponding to a first frequency $F_1$. Coupling length L3 has a length equal to an effective quarter wavelength $\lambda_{eff}/4$ corresponding to a second frequency $F_2$. The second frequency $F_2$ is higher than the first frequency $F_1$. These frequencies, in combination with the overlapping arrangements between the antenna lines 16, 18, 20 within the spoiler substrate 15 forms a coupled transmission line band-pass filter 40. The specific features of this coupled transmission line band-pass filter 40 will be discussed below in connection with FIG. 6. However, before this, the functionality of a two-coupled transmission line will be discussed.

Figure 3:
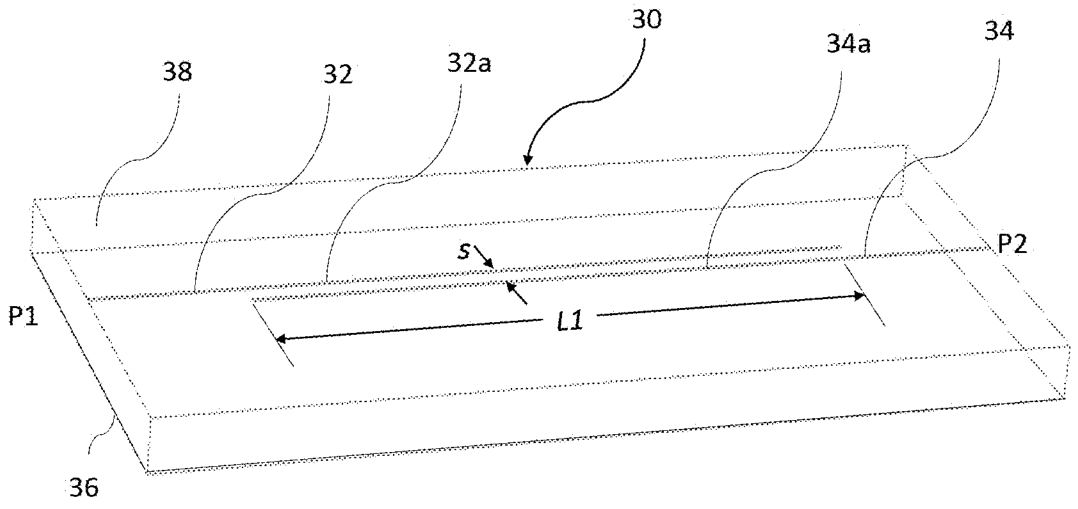
FIG. 3 shows an antenna line filter with two coupled antenna lines.

With reference to FIG. 3, a two-coupled antenna line of the coupled layout described above is shown. Two antenna lines 32, 34 are coupled together by being laid over a common ground plane 36 and separated by a distance S. Coupled antenna lines 32, 34 are isolated from the ground plane 36 by an insulation layer 38 that has a relative dielectric constant $\varepsilon_r$. Portions of the antenna lines 32, 34 overlap along a length L1. The overlapping portions 32*a*, 34*a* of antenna lines 32, 34 have a length L1 that is equal to an effective quarter wavelength $\lambda_{eff}/4$ corresponding to the center frequency of the band-pass. The electrical behavior of the two coupled antenna lines 32, 34 can be described by reference to an S-parameter matrix of a 2-port device. The S-parameter matrix may be related to the space S between the antenna lines 32, 34. The reflection coefficient $S_{11}$ and transmission loss $S_{21}$ of the 2-port device can be utilized to evaluate the coupled antenna line 32, 34 filter performance.

Figure 4:
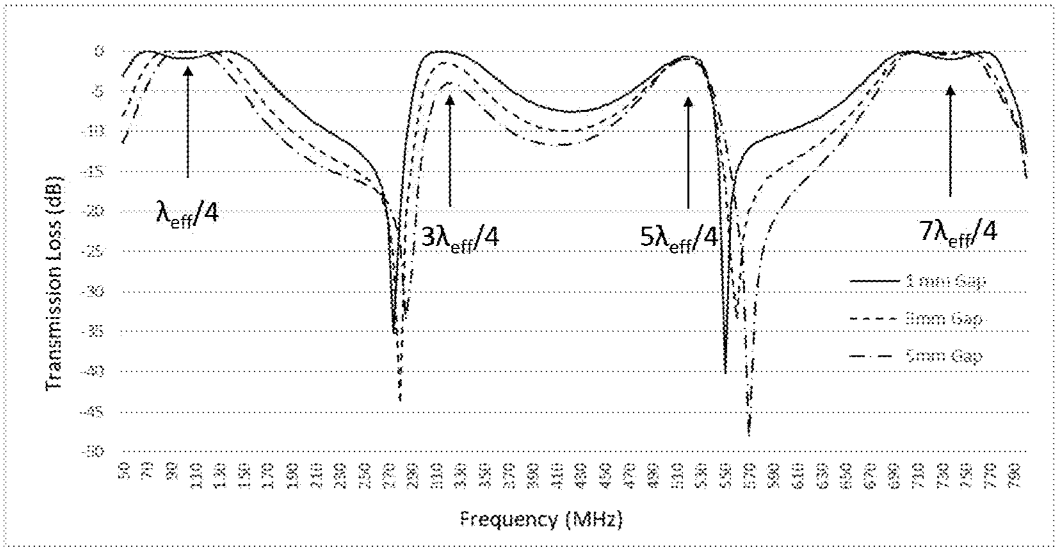
FIG. 4 is a simulated signal transmission plot that shows coupling over 50 to 800 MHz in the coupled antenna line filter shown in FIG. 3 with dimensions intended for FM band-pass.

FIG. 4 is the $S_{21}$ plot showing what results when the separation S between the coupled transmission lines 32, 34 equals 1 mm, 3 mm and 5 mm over 50-800 MHz, respectively. The overlapping distance L1 between transmission lines 32A, 34A is 360 mm and is equal to an effective quarter wavelength $\lambda_{eff}/4$ corresponding to a frequency of 100 MHz in FM band. In these examples, the thickness of substrate 38 is 12.7 mm, the widths of the transmission lines 32, 34 are 2 mm, and the relative dielectric constant, $\varepsilon_r$, of the substrate 38 equals 3.38. FIG. 4 shows that coupling is achieved at odd multiples of approximately $\lambda_{eff}/4$, i.e., 100 MHz, 300 MHz, 500 MHz, etc. This indicates that the bandwidth of the transmission line filter decreases as the transmission line separation distance S increases, and the coupling loss increases at $3\lambda_{eff}/4$ (300 MHz) as the transmission line separation distance S increases.

Figure 5:
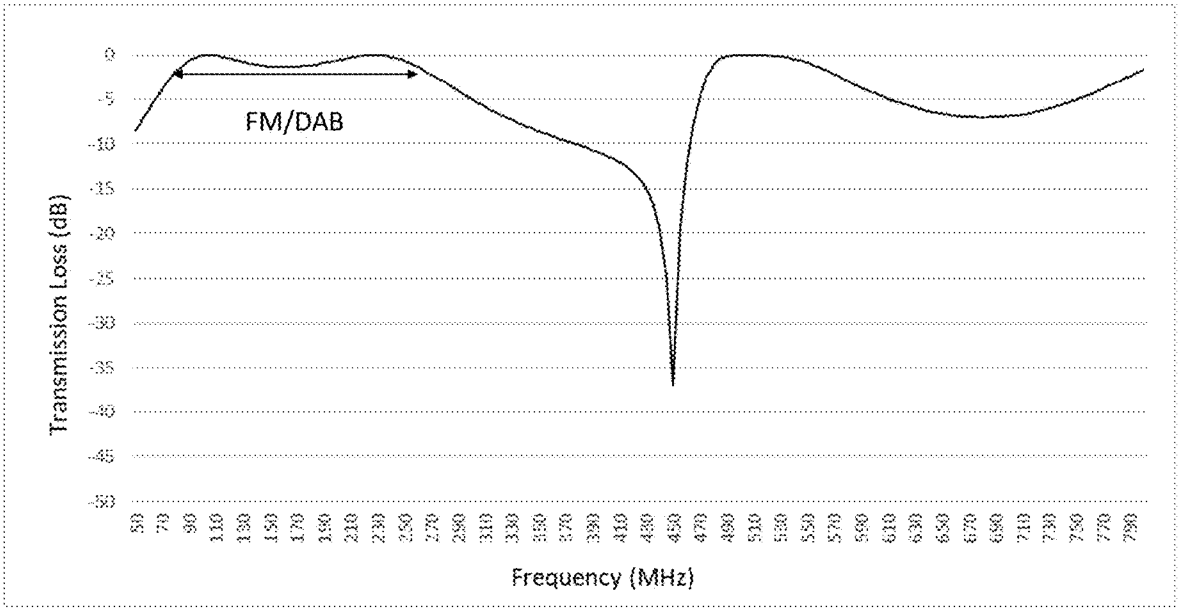
FIG. 5 is a simulated signal transmission plot that shows coupling over 50 to 800 MHz in the coupled antenna line filter shown in FIG. 3 with dimensions intended for FM and DAB bands.

FIG. 5 is the $S_{21}$ plot showing what results when the separation S between the coupled antenna lines 32, 34 equals 0.5 mm over 50-800 MHz. The overlapping distance L1 between the coupled antenna lines 32, 34 is 220 mm and is equal to the effective quarter wavelength $\lambda_{eff}/4$ corresponding to a frequency of 170 MHz in the middle of the FM and DAB band from 76 MHz-240 MHz. In these examples, the thickness of substrate 38 is 12.7 mm, the widths of the transmission lines 32, 34 are 2 mm, and the relative dielectric constant, $\varepsilon_r$, of substrate 38 equals 3.38. FIG. 5 shows that coupling is achieved at odd multiples of approximately $\lambda_{eff}/4$, i.e., 170 MHz and 510 MHz. FIG. 5 also indicates there are two resonate peaks under these conditions, one at 100 MHz and another at 220 MHz. This results in wide bandwidths which covers both FM and DAB frequency bands from 76 MHz to 240 MHz. In the TV frequency band from 470 MHz-690 MHz, only one coupling peak appears at 510 MHz, and that only covers a portion of the TV band.

Figure 6:
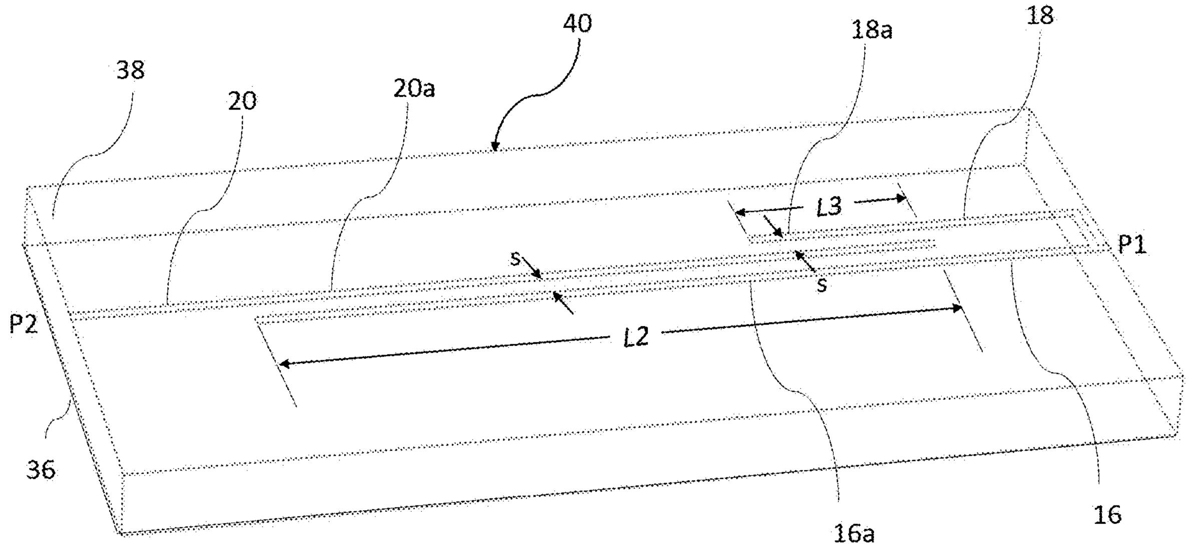
FIG. 6 shows an antenna line filter with three coupled transmission lines.

In view of the information conveyed in FIGS. 3-5 and discussed above, the spoiler antenna 14 and band-pass filter 40 shown in FIG. 2 can be discussed in greater detail. With reference now to FIG. 6, band-pass filter 40 is shown. Antenna lines 16, 18, 20 can be broken down into two sections. A first section is located near ports P1, P2 where the antenna lines 16, 18, 20 are not coupled to any other antenna lines 16, 18, 20. A second section is located in an overlapping region, where antenna lines 16, 18, 20 overlap with one another, which are identified by reference numbers 16*a*, 18*a*, 20*a*. As noted above, antenna lines 16*a*, 20*a* overlap along length L2, and antenna lines 18*a*, 20*a* overlap along length L3. Length L2 has a length equal to an effective quarter wavelength $\lambda_{eff}/4$ corresponding to the center frequency of the FM/DAB band, and L3 has a length equal to an effective quarter wavelength $\lambda_{eff}/4$ corresponding to the center frequency of the TV band. This arrangement between the antenna lines 16, 18, 20 allows for band-pass filter 40 to pass frequencies in each of the FM, DAB, and TV bands in a manner similar to that discussed above with coupled antenna lines 32, 34.

Figure 7:
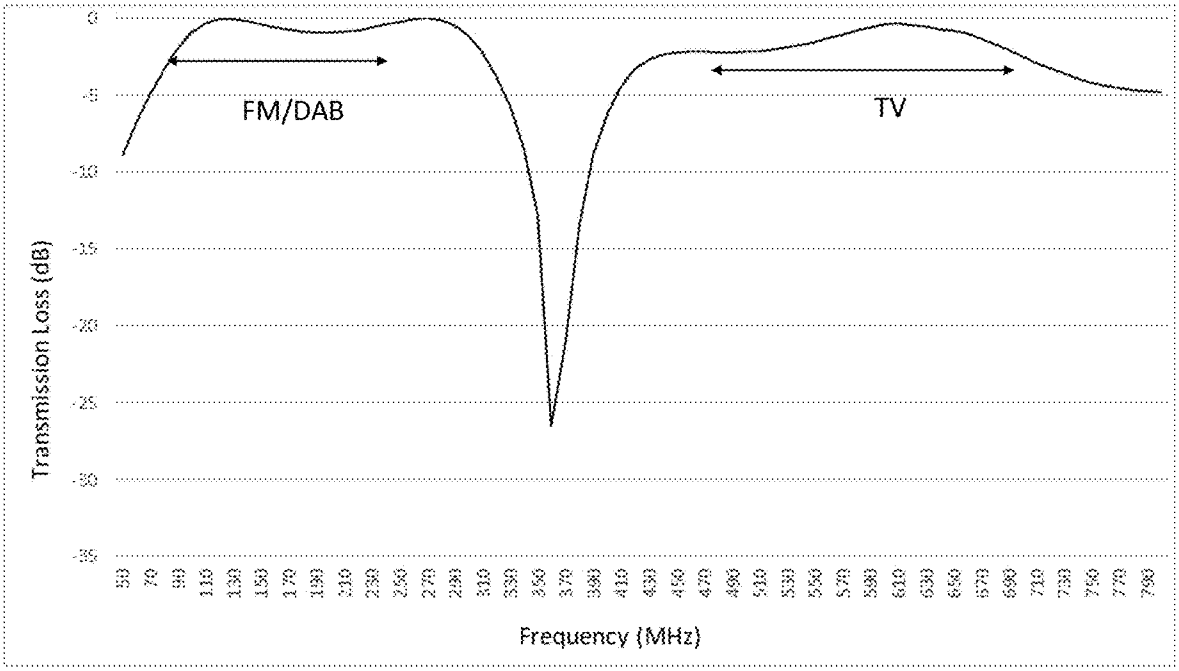
FIG. 7 is a simulated signal transmission plot that shows coupling over 50 to 800 MHz in the coupled antenna line filter shown in FIG. 6 with dimensions intended for FM, DAB and TV bands.

FIG. 7 is the $S_{21}$ plot showing what results from the band-pass filter 40 of FIG. 6 over 50-800 MHz. The separation distances S between antenna line 16*a* and antenna line 20*a* as well as antenna line 18*a* and antenna line 20*a* equal 0.5 mm. The overlapping distance L2 between antenna line 16*a* and antenna line 20*a* is 180 mm and is equal to the effective quarter wavelength $\lambda_{eff}/4$ corresponding to a frequency of approximately 190 MHz between the FM and DAB band from 76 MHz-240 MHz. The overlapping distance L3 between antenna line 18*a* and antenna line 20*a* is 45 mm and is equal to the effective quarter wavelength $\lambda_{eff}/4$ corresponding to a frequency of around 600 MHz near the middle of the TV frequency from 470 MHz-690 MHz. In this configuration, the thickness of substrate 38 is 12.7 mm, the width of each antenna line 16, 18, and 20 is 2 mm, and the relative dielectric constant, $\varepsilon_r$, of substrate 38 is 3.38. FIG. 7 shows that coupling is achieved at FM frequency from 76-108 MHz, DAB frequency from 174-240 MHz, and TV frequency from 470-690 MHz. Therefore, adding additional coupling lines can increase the filter bandwidth or introduce additional signal coupling bands.

Figure 8:
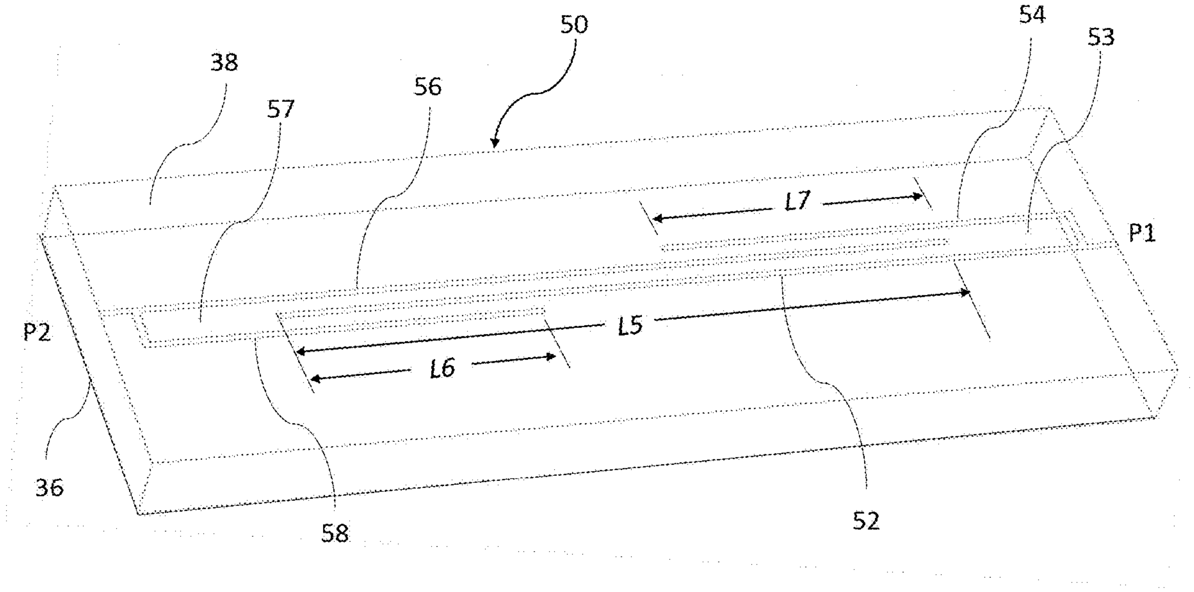
FIG. 8 shows an antenna line filter with four coupled transmission lines.

An example of additional antenna lines to the band-pass filter is shown in FIG. 8. This new embodiment shows a band-pass filter 50. With reference to FIG. 8, four coupled antenna lines 52, 54, 56, 58 are shown laying over an insulation layer 38 that isolates the antenna lines 52, 54, 56, 58 from the common ground plane 36. The insulation layer has a dielectric constant Er. Antenna line 52 and antenna line 54 are connected at one end that is proximate a first port P1. Antenna line 52 extends in a straight line across the insulation layer 38, while antenna line 54 extends perpendicularly from antenna line 52 before extending in the same direction as antenna line 52 and parallel thereto. Antenna line 56 and antenna line 58 are connected at one end that is proximate a second port P2. Antenna line 56 extends in a straight line toward the first port P1, while antenna line 58 extends perpendicularly from antenna line 56 before extending in the same direction as antenna line 56 and parallel thereto. These arrangements essentially define opposing and interlocking pairs of antenna lines. A first pair of antenna lines 52, 54 define a space 53. A second pair of antenna lines 56, 58 define a space 57. Antenna line 56 extends into the first space 53, while antenna line 52 extends into the second space 57. Antenna line 52 is coupled with antenna line 56 along a length L5, antenna line 52 is coupled with antenna line 58 along a length L6, and antenna line 54 is coupled with antenna line 56 along line L7. L5 has a length equal to an effective quarter wavelength $\lambda_{eff}/4$ corresponding to a first frequency $F_1$. L6 has a length equal to an effective quarter wavelength $\lambda_{eff}/4$ corresponding to the second frequency $F_2$. L7 has a length equal to an effective quarter wavelength $\lambda_{eff}/4$ corresponding to a third frequency $F_3$. $F_1$, $F_2$ and $F_3$ represent center frequencies of three different bands. Adding more coupling lines in the filter can result in better antenna performance with wide bandwidth and additional signal passing bands.

Figure 9:
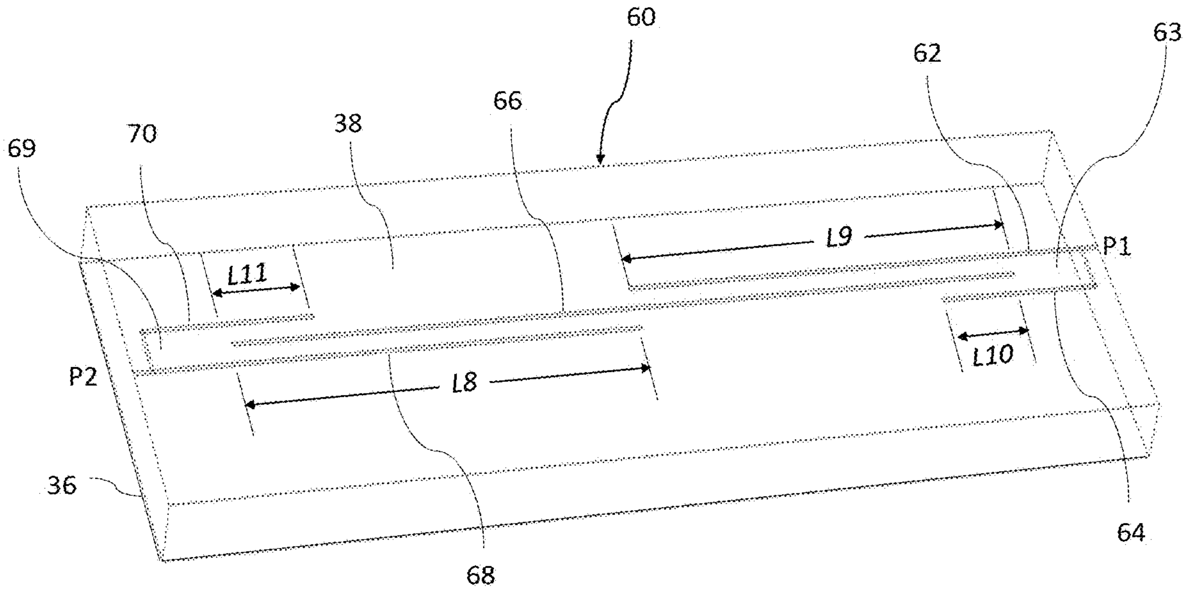
FIG. 9 shows an antenna line filter with five coupled transmission lines.

The band-pass performance of a filter improves with more coupling wires than a single-section coupler line filter such as that shown in FIG. 3. FIG. 9 shows another example of a transmission band-pass filter 60 using a five coupled line layout. Five antenna lines 62, 64, 66, 68 70 lay over an insulation layer 38 that isolates the antenna lines 62, 64, 66, 68, 70 from a common ground plane 36. The insulation layer 38 has a dielectric constant Er. The antenna lines 62, 64, 66, 68, 70 are separated by a distance S. Antenna line 62 is connected to antenna line 64 proximate the first port P1. The connection between antenna line 62 and antenna line 64 is similar to the connection between antenna line 52 and antenna line 54 in that antenna line 62 and antenna line 64 define a space 63 therebetween. Antenna line 68 is connected to antenna line 70. This connection is also similar to the other antenna line connections discussed herein, so that antenna line 68 and antenna line 70 also define a space 69 therebeteween. Antenna line 66 is a parasitic element that is electromagnetically coupled to the other four lines as a common coupling line. Antenna line 66 extends between the defined spaces 63, 69. Antenna line 66 is coupled with antenna line 68 along length L8. Antenna line 66 is coupled with antenna line 62 along length L9. Antenna line 66 is coupled with antenna line 64 along length L10. Antenna line 66 is coupled with antenna line 70 along length L11. Lengths L8, L9, L10, L11 may each, respectively, have lengths that are equal to an effective quarter wavelength $\lambda_{eff}/4$ corresponding to four different frequencies $F_1$, $F_2$, $F_3$, $F_4$. These frequencies $F_1$ $F_2$, $F_3$, $F_4$ may represent center frequencies of four different signal pass-bands in a manner similar to that described above.

Figure 10:
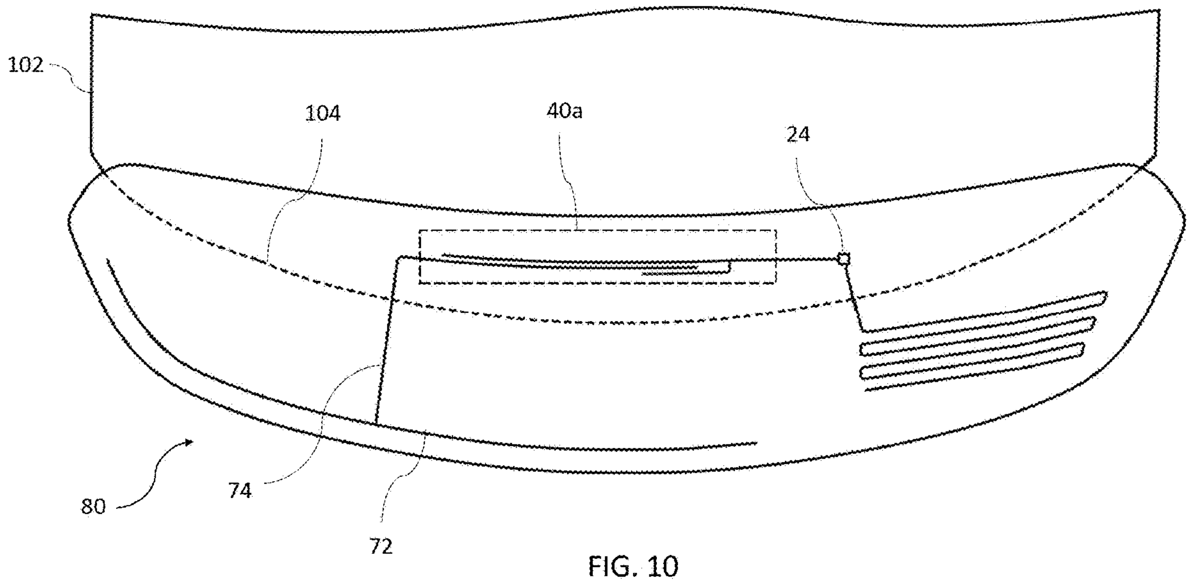
FIG. 10 shows a spoiler antenna according to another embodiment or aspect of the present disclosure.

Spoiler antennas, such as those described herein, are capable of performing in a concealed antenna that can be manufactured in a lower cost. Other devices may be mounted in the spoiler such as a high mount stop lamp and an associated wire harness. Antenna layout has to avoid the wire harness and stop lamp to minimize interference. Therefore, different antenna layouts are possible depending on the amplifier position, spoiler molding and wire harness position. FIG. 10 shows a spoiler antenna 80 where the antenna line band-pass filter 40*a* is located above the spoiler supporting conductive vehicle roof penal 102. The portion of the antenna elements within the vehicle roof penal 102 is highlighted by the metal edge 104. The main antenna radiation elements are identified by element numbers 72 and 74. The transmission line filter 40*a* transfers signals from the antenna radiation elements 72, 74 to the antenna connector 24 when the antenna is utilized for receiving broadcasting signals.

Figure 11:
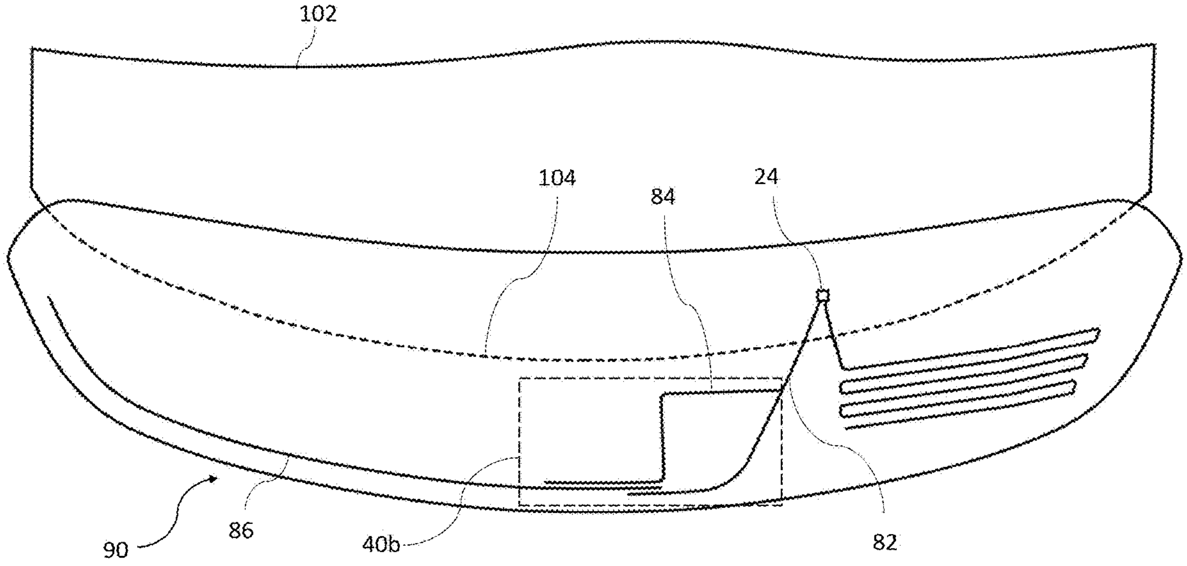
FIG. 11 shows a spoiler antenna according to another embodiment or aspect of the present disclosure.
Figure 12:
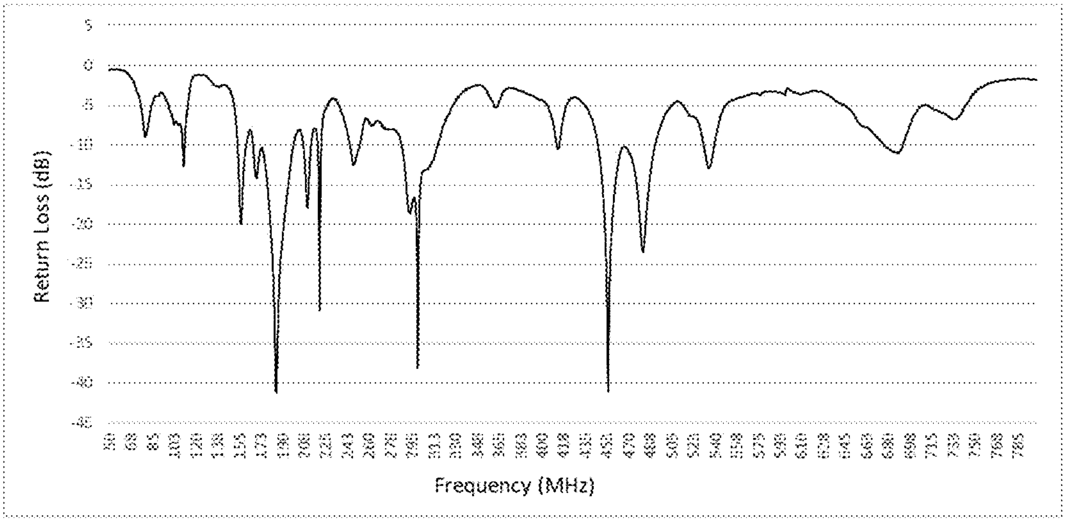
FIG. 12 is a plot of the antenna return loss showing the antenna resonant frequency bands from 50 to 800 MHz in the spoiler antenna shown in FIG. 11.

FIG. 11 shows another example of a spoiler antenna 90 where the transmission line band-pass filter 40*b* is located below the conductive vehicle body penal 102. In this case, all the antenna elements are radiating since these elements are away from a vehicle body ground edge 104. In this case, the transmission line band-pass filter 40*b* is not only used as a filter but also part of the antenna that radiates signals. The radiation pattern of the spoiler antenna can be represented as a superposition of fields produced by currents on three radiating elements: the input section of 82 from antenna connector 24 up to the filter 40*b* terminal point, the filter section 40*b*, and the end section of wire 86 from the band-pass filter 40*b* terminal to the end of line 86. The S11 output of the spoiler antenna 90 shown in FIG. 11 is shown in FIG. 12. FIG. 12 is the plot of the return loss (S11) of the spoiler antenna 90. From the power delivered to the antenna 90, return loss is a measure of the power reflected from the antenna 90 and the power "accepted" by the antenna and radiated. FIG. 12 shows that the antenna 90 resonates in multiple frequency bands from 50 MHz up to 800 MHz. That frequency range covers FM band (76 MHz-108 MHz), digital audio broadcasting (DAB III) (174 MHz-240 MHz), and TV band (474 MHz-690 MHz). Results of far-field gain measurements show that the antenna performs very well at all FM/DAB and TV bands. The spoiler antenna loaded with a transmission line filter demonstrates the capability for multi-band application that can reduce the number of antennas, simplify antenna amplifier design, and reduce overall costs for the antenna system.

While the disclosed invention has been described and illustrated by reference to certain preferred embodiments and implementations, it should be understood that various modifications may be adopted without departing from the spirit of the invention or the scope of the following claims.

The invention claimed is:

1. A band-pass filter comprising:

a first electrical conductor extending a first distance;

a second electrical conductor extending from the first electrical conductor, the second electrical conductor extending a second distance, a portion of which is parallel to the first distance; and a third electrical conductor extending a third distance parallel to and between the first electrical conductor and the second electrical conductor, wherein the first electrical conductor and the third electrical conductor at least partially overlap along a first length, the first electrical conductor and the third electrical conductor being electromagnetically coupled at least along the first length, wherein the second electrical conductor and the third electrical conductor at least partially overlap along a second length, the second electrical conductor and the third electrical conductor being electromagnetically coupled at least along the second length, wherein the first length corresponds to a first frequency, and wherein the second length corresponds to a second frequency.

2. The band-pass filter of claim 1, wherein the first length is equal to an effective quarter wavelength corresponding to the first frequency.

3. The band-pass filter of claim 2, wherein the first frequency is a center frequency of an FM/DAB band.

4. The band-pass filter of claim 1, wherein the second length is equal to an effective quarter wavelength corresponding to the second frequency.

5. The band-pass filter of claim 4, wherein the second frequency is a center frequency of a TV band.

6. The band-pass filter of claim 1, further comprising a fourth electrical conductor extending from the third electrical conductor, the fourth electrical conductor extending a fourth distance, a portion of which is parallel to the first, second, and third distances, wherein the fourth electrical conductor and the first electrical conductor at least partially overlap along a third length, the fourth electrical conductor and the first electrical conductor being electromagnetically coupled at least along a third length, wherein the third length corresponds to a third frequency.

7. The band-pass filter of claim 6, wherein the third length is equal to an effective quarter wavelength corresponding to the third frequency.

8. The band-pass filter of claim 7, wherein the third frequency is a center frequency of a broad band.

9. The band-pass filter of claim 1, wherein the first electrical conductor is connected to a first pin of an antenna connector at an end opposing the first length.

10. The band-pass filter of claim 9, wherein a second pin of the antenna connector is coupled to a fifth electrical connector, the fifth electrical connector configured to receive AM broadcasting signals.

11. The band-pass filter of claim 1, wherein the third electrical conductor is separated from the first electrical conductor by a first width, and the third electrical conductor is separated from the second electrical conductor by a second width.

12. A band-pass filter comprising:

a parasitic element extending a first distance; and a first electrical conductor comprising:

a first branch extending a second distance, the second distance at least partially overlapping and extending parallel to the parasitic element; and a second branch extending a third distance, the third distance at least partially overlapping and extending parallel to the parasitic element, wherein the first branch overlaps the parasitic element along a first length, the first branch and the parasitic element being electromagnetically coupled along the first length, wherein the second branch overlaps the parasitic element along a second length, the second branch and the parasitic element being electromagnetically coupled along the second length, wherein the first length corresponds to a first frequency, and wherein the second length corresponds to a second frequency.

13. The band-pass filter of claim 12, wherein the second branch is connected to the first branch proximate a first port at a first end of the band-pass filter.

14. The band-pass filter of claim 12, wherein the first frequency is a center frequency of an FM/DAB band, and wherein the second frequency is a center frequency of a TV band.

15. The band-pass filter of claim 12, further comprising:

a second electrical conductor comprising:

a third branch extending a fourth distance, the fourth distance at least partially overlapping and extending parallel to the parasitic element; and a fourth branch extending a fifth distance, the fifth distance at least partially overlapping and extending parallel to the parasitic element, wherein the third branch overlaps the parasitic element along a third length, the third branch and the parasitic element being electromagnetically coupled along the third length, wherein the fourth branch overlaps the parasitic element along a fourth length, the fourth branch and the parasitic element being electromagnetically coupled along the fourth length, wherein the third length corresponds to a third frequency, and wherein the fourth length corresponds to a fourth frequency.

16. The band-pass filter of claim 15, wherein the fourth branch is connected to the third branch proximate a second port at a second end of the band-pass filter, the second end opposing the first end.

17. A spoiler antenna assembly for an automobile, the assembly comprising:

a spoiler mounted to the automobile, the spoiler comprising a spoiler substrate; and a spoiler antenna disposed on the spoiler substrate, the spoiler antenna comprising:

a first electrical conductor extending a first distance;

a second electrical conductor extending from the first electrical conductor, the second electrical conductor extending a second distance, a portion of which is parallel to the first distance; and a third electrical conductor extending a third distance parallel to and between the first electrical conductor and the second electrical conductor, wherein the first electrical conductor and the third electrical conductor at least partially overlap along a first length, the first electrical conductor and the third electrical conductor being electromagnetically coupled at least along the first length, wherein the second electrical conductor and the third electrical conductor at least partially overlap along a second length, the second electrical conductor and the third electrical conductor being electromagnetically coupled at least along the second length, wherein the first length corresponds to a first frequency, and wherein the second length corresponds to a second frequency.

18. The spoiler antenna assembly of claim 17, wherein the spoiler antenna further comprises:

a fourth electrical conductor extending from the third electrical conductor, the fourth electrical conductor extending a fourth distance, a portion of which is parallel to the first, second, and third distances, wherein the fourth electrical conductor and the first electrical conductor at least partially overlap along a third length, the fourth electrical conductor and the first electrical conductor being electromagnetically coupled at least along a third length, wherein the third length corresponds to a third frequency.

19. The spoiler antenna assembly of claim 18, wherein the first frequency is a center frequency of an FM/DAB band, the second frequency is a center frequency of a TV band, and the third frequency is a center frequency for a broad band.

20. The spoiler antenna assembly of claim 17 further comprising a cover mounted to the spoiler and configured to cover the spoiler antenna.

* * * * *